United States Patent Office 3,224,484
Patented Dec. 21, 1965

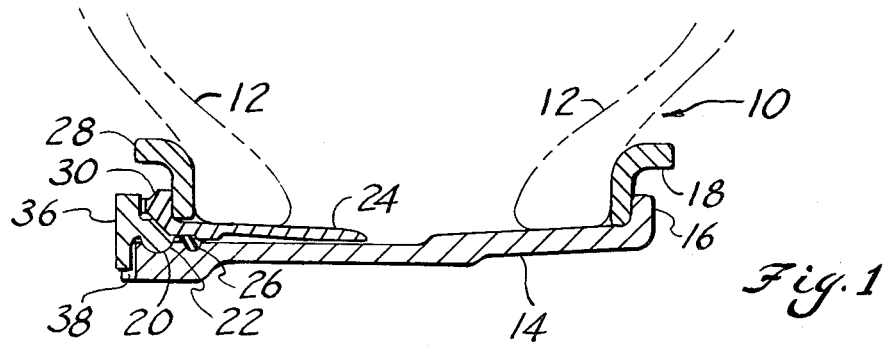
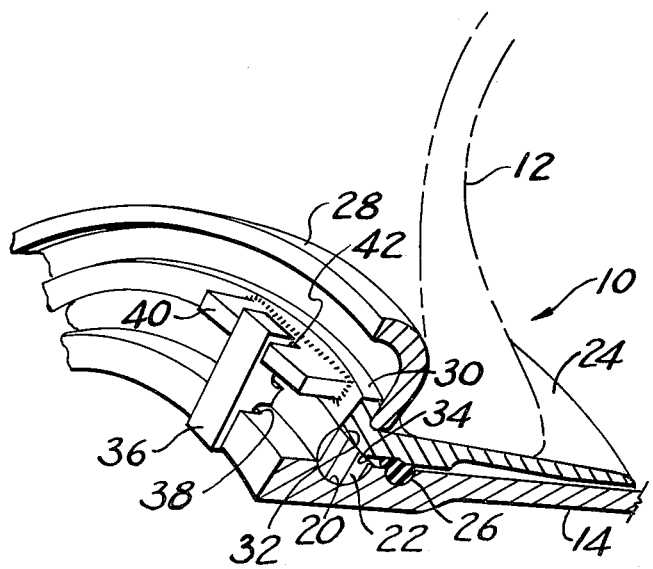

3,224,484
WHEEL CONSTRUCTION
Hoyt W. Smith, Peoria, Ill., assignor to Le Tourneau-Westinghouse Company, Peoria, Ill., a corporation of Illinois
Filed Apr. 22, 1964, Ser. No. 361,689
1 Claim. (Cl. 152—410)

The present invention relates generally to wheel or rim construction and more particularly to wheel or rim construction for mounting large tires, especially tires of the type generally utilized on trucks and off-highway vehicles.

Modern vehicles, particularly those referred to as earth movers or off-road equipment, have been increased in size and capacity to the point that some of the previous structural elements are no longer entirely suitable. The usual rim structure used on this equipment includes, on the mounting edge, an endless separate bead seat ring that telescopes over the rim base with one of the tire beads wedged thereon. A rim flange is retained between the tire casing and an outward extending flange on the bead seat ring, and a lock ring, usually a split type, is inserted in a groove or gutter formed in the rim base and engages the bead seat ring to lock these members in place on the rim base. The lock ring, the gutter and the outer edge of the bead seat ring have taken on a variety of cross sectional shapes, as for example those shown in the patents to Riggs 2,563,748 and 2,808,870, to assure that the tire is securely held on the rim. However, as the tire size increases, even though the inflation pressure remains the same, and also because of the rough terrain encountered, the forces tending to spread the tire casing— i.e., move the casing axially outward relative to the rim— become quite large. The stresses created thereby in the lock ring and the members in engagement therewith become critical and often result in failure. One of the reasons for such failures is that the physical shape and configuration of the lock ring in relation to the gutter and the bead seat ring creates areas of stress concentration in one or a combination of the bead seat ring, the lock ring, and the outer edge of the rim base. Increasing the size or "beefing up" these components so that the stress, even in the areas of concentration, remains relatively low is undesirable because this adds to the unsprung mass of the vehicle.

It is, therefore, an object of the present invention to provide a rim construction which is light of weight, strong and devoid of stress concentrations, and which will securely retain the tire on the rim. This and other objects and attendant advantages will become apparent to those skilled in the art from a consideration of the following description and the appended drawings, wherein:

FIG. 1 is a cross sectional view of a wheel illustrating the features of the present invention; and FIG. 2 is a perspective view, partly in section and with portions broken away, of the wheel construction shown in FIG. 1.

Referring now in detail to the drawings, there is shown in FIG. 1 a wheel, indicated generally at 10 consisting essentially of a tire 12 mounted on a rim or base member 14. Along one edge of the base member 14 is an upturned portion 16 against which an annular bead retaining or rim flange 18 lies when the rim is assembled. Along the opposite edge of the base member 14 is a gutter or groove 20, substantially semicircular in cross section, in which a split lock ring 22 is mounted to engage the endless bead seat ring 24. The bead seat ring 24 telescopes over the base member 14 and an O-ring 26 is provided to seal the clearance between the base member and the bead seat ring. A rim flange 28 engages an outwardly flanged portion 30 on the bead seat ring 24. The lock ring 22 has a cross sectional shape defined by a circle with a segment thereof removed, thereby forming a circular torus with a conical surface 32 which appears as a straight line in a section through the cone of which surface 32 forms a part, as seen in FIGS. 1 and 2. The outer edge of the bead seat ring 24 is chamfered to form another conical surface 34. The two surfaces 32 and 34 are in engagement with each other when the rim is assembled.

A driver or torque tranmitting means is provided to prevent rotation or slippage of the bead seat ring 24 relative to the base member 14. A lug 36 is secured to the lock ring 22 and extends radially in both directions beyond the ring 22. A notch 38 of a size to accommodate the lug 36 is provided in the outer edge of the base member 14. A bracket 40 also having a notch 42 is secured to the outer surface of the flanged portion 30. The lug 36 is inserted in the notches 38 and 42 when the lock ring 22 is positioned within the gutter 20, thereby assuring that the lock ring 22, the base member 14 and the bead seat ring 24 rotate as a unit.

Operation

When the tire 12 is mounted on the rim, the circular portion of the lock ring 22 is mounted in the semicircular gutter 20 with conical surface 32 in contact with conical surface 34 on the bead seat ring 24. The areas which must resist the spreading of the tire 12 are smooth conical surfaces and substantially cylindrical surfaces. None of the components presents a pointed edge or corner to be contacted by the adjacent member, and thus, no areas of stress concentration are created.

It is to be understood that various modifications and variations can be made within the scope of the present invention, which is defined by the appended claim.

What is claimed is:

A rim construction for mounting a tire comprising:
a base member having an annular gutter of semicircular cross-section,
the base member having a notch in the outer edge thereof,
an annular bead seat ring telescopically positionable over the base member and having a radially and outwardly flanged portion and a chamfered outer edge forming a conical surface,
an annular rim flange positionable adjacent to and in engagement with the inner surface of said flanged portion,
a generally U-shaped bracket secured to said flanged portion,
an annular lock ring of circular cross-section positionable in said gutter and having a conical surface engageable with said chamfered outer edge, and
a lug secured to said lock ring and engageable in said notch and said bracket.

References Cited by the Examiner

UNITED STATES PATENTS

| 796,873 | 8/1905 | Seiberling | 152—410 |
| 922,597 | 5/1909 | Kintz | 152—410 |
| 2,835,303 | 5/1958 | Woodward | 152—410 |
| 3,003,538 | 10/1961 | Gerbeth | 152—410 X |

EUGENE G. BOTZ, Primary Examiner.

ARTHUR L. LA POINT, Examiner.

C. W. HAEFELE, Assistant Examiner.